United States Patent
Ender

(10) Patent No.: US 9,261,643 B2
(45) Date of Patent: Feb. 16, 2016

(54) HOLLOW LIGHTGUIDE HAVING MULTIPLE REFLECTORS

(75) Inventor: David A. Ender, New Richmond, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 1016 days.

(21) Appl. No.: 13/382,972

(22) PCT Filed: Jul. 19, 2010

(86) PCT No.: PCT/US2010/042421
§ 371 (c)(1),
(2), (4) Date: Jan. 9, 2012

(87) PCT Pub. No.: WO2011/011314
PCT Pub. Date: Jan. 27, 2011

(65) Prior Publication Data
US 2012/0114284 A1    May 10, 2012

Related U.S. Application Data

(60) Provisional application No. 61/226,815, filed on Jul. 20, 2009.

(51) Int. Cl.
G02B 6/10    (2006.01)
F21V 8/00    (2006.01)
G02B 6/28    (2006.01)

(52) U.S. Cl.
CPC ............ G02B 6/0096 (2013.01); G02B 6/0018 (2013.01); G02B 6/0038 (2013.01); G02B 6/2804 (2013.01)

(58) Field of Classification Search
CPC .......................... G02B 6/0096; G02B 6/0018
See application file for complete search history.

(56) References Cited

U.S. PATENT DOCUMENTS

| 4,562,517 | A | * | 12/1985 | Pankin | F21S 8/04 362/147 |
|---|---|---|---|---|---|
| 4,929,866 | A | | 5/1990 | Murata | |
| 5,914,760 | A | * | 6/1999 | Daiku | G02B 3/005 349/62 |
| 6,099,156 | A | | 8/2000 | Jenkins | |
| 6,792,213 | B1 | | 9/2004 | Okada | |
| 2005/0213872 | A1 | | 9/2005 | Iwamori | |
| 2010/0053497 | A1 | | 3/2010 | Nagata | |

FOREIGN PATENT DOCUMENTS

| JP | 57-196401 | 12/1982 |
|---|---|---|
| JP | 01-251502 | 10/1989 |
| JP | 04-372907 | 12/1992 |
| JP | 05-273421 | 10/1993 |

(Continued)

OTHER PUBLICATIONS

ISA210 International Search Report of PCT/US2010/042421, mailed Feb. 23, 2011, 5 pages.

(Continued)

*Primary Examiner* — Michelle R Connelly
*Assistant Examiner* — Hoang Tran
(74) *Attorney, Agent, or Firm* — Yufeng Dong

(57) ABSTRACT

Lightguide is disclosed. The lightguide includes a staircase shape optical construction that includes a plurality of light reflecting risers. At least two of the risers include non-parallel light reflecting portions.

16 Claims, 7 Drawing Sheets

(56) References Cited

FOREIGN PATENT DOCUMENTS

| | | |
|---|---|---|
| JP | 10-97805 A | 4/1998 |
| JP | 2002-062457 | 2/2002 |
| JP | 2004-157438 A | 6/2004 |
| JP | 2005-266619 A | 9/2005 |
| JP | 2005-274962 A | 10/2005 |
| JP | 2006-52992 | 2/2006 |
| WO | WO 2008/114507 | 9/2008 |
| WO | WO 2010-124158 | 10/2010 |

OTHER PUBLICATIONS

Written Opinion for PCT/US2010/042421, 10 pages.

* cited by examiner

HOLLOW LIGHTGUIDE HAVING MULTIPLE REFLECTORS

CROSS REFERENCE TO RELATED APPLICATIONS

This application is a national stage filing under 35 U.S.C. 371 of PCT/US2010/042421, filed on Jul. 19, 2010, which claims priority to U.S. Provisional Application No. 61/226,815, filed on Jul. 20, 2009, the disclosure of which is incorporated by reference in its/their entirety herein.

FIELD OF THE INVENTION

This invention generally relates to lightguides having multiple reflectors. The invention is further applicable to optical systems, such as display and general lighting systems, incorporating such lightguides.

BACKGROUND

Light sources have many applications such as general lighting or display applications. In many applications, it is desired that a light source efficiently emit uniform light over a desired area and in a particular direction. Many light sources include one or more lamps and means to provide an extended emission area emitting light along a desired direction.

SUMMARY OF THE INVENTION

Generally, the present invention relates to lightguides. In one embodiment, a lightguide includes a staircase shape optical construction that includes a plurality of light reflecting risers. At least two of the risers include non-parallel light reflecting portions. In some cases, the lightguide is hollow. In some cases, one of the light reflecting risers is disposed on an inner wall of the lightguide and at least one other light reflecting riser is disposed in an interior of the lightguide. In some cases, the light reflecting risers have an average specular optical reflectance in the visible for normally incident light that is not less than about 60%. In some cases, at least one of the light reflecting risers includes a metal light reflector or a reflective multilayer optical film.

In another embodiment, a lightguide includes an input arm, a first output arm, a second output arm, and a bend that connects the input arm to the first and second output arms. The bend includes a first light reflector for reflecting light from the input arm to the first output arm, and a second light reflector for reflecting light from the input arm to the second output arm. The second light reflector is offset relative to the first light reflector along two mutually orthogonal directions. In some cases, the lightguide is hollow. In some cases, each of the input arm, first output arm, second output arm, and the bend is hollow. In some cases, at least one of the first and second light reflectors includes a metal light reflector or a reflective multilayer optical film. In some cases, each of the mutually orthogonal directions is either orthogonal or parallel to a thickness direction of the bend. In some cases, each of the mutually orthogonal directions is either orthogonal or parallel to a thickness direction of the lightguide. In some cases, the lightguide includes a staircase shape optical construction that includes a plurality of light reflecting risers. One of the risers includes the first light reflector. One other riser includes the second light reflector. In some cases, at least one of the first and second light reflectors includes a planar portion, is piecewise planar, includes a curved portion, or is piecewise curved. In some cases, one of the first and second light reflectors includes a planar portion and the other of the first and second light reflectors includes a curved portion. In some cases, the lightguide generally defines a plane of the lightguide where, in some cases, the first and second light reflectors are perpendicular to the plane of the lightguide.

In another embodiment, a lightguide includes an input arm, a plurality of output arms, and a staircase shape optical construction for directing light from the input arm to the plurality of output arms. The optical construction includes a plurality of light reflecting risers. In some cases, at least one of the risers includes a planar portion, is piecewise planar, includes a curved portion, or is piecewise curved.

In another embodiment, a light source includes a lamp that emits light, and a lightguide that receives the emitted light and includes a staircase shape optical construction that includes a plurality of light reflecting risers. In some cases, the light source emits substantially uniform light across a projected area of the optical construction onto an emitting surface of the lightguide. In some cases, the light source emits substantially uniform light across the emitting surface of the lightguide. In some cases, the lightguide includes a transflective top surface. In some cases, the lightguide includes a structured top surface that, in some cases, includes a plurality of retro-reflective structures, such as cube corners. In some cases, the lightguide includes a first arm, a second arm that makes an oblique angle with the first arm, and a bend that connects the first arm to the second arm and includes the staircase shape optical construction. In some cases, the light source is planar. In some cases, the light source is non-planar.

BRIEF DESCRIPTION OF DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

This invention generally relates to lightguides having multiple reflectors. The multiple reflectors form a staircase shape optical construction that includes multiple light reflecting risers. The risers reflect light in one or more directions within the lightguide with no or very little effect on the uniformity of light that is extracted from the lightguide. In some cases, the disclosed lightguides efficiently transfer light that propagates in an input arm of the lightguide to two or more output arms or branches of the lightguide. Some disclosed lightguides include a bend portion that includes a staircase shape optical construction having light reflective risers for reflecting or directing light from the input arm to one or more output arms.

Figure 1:
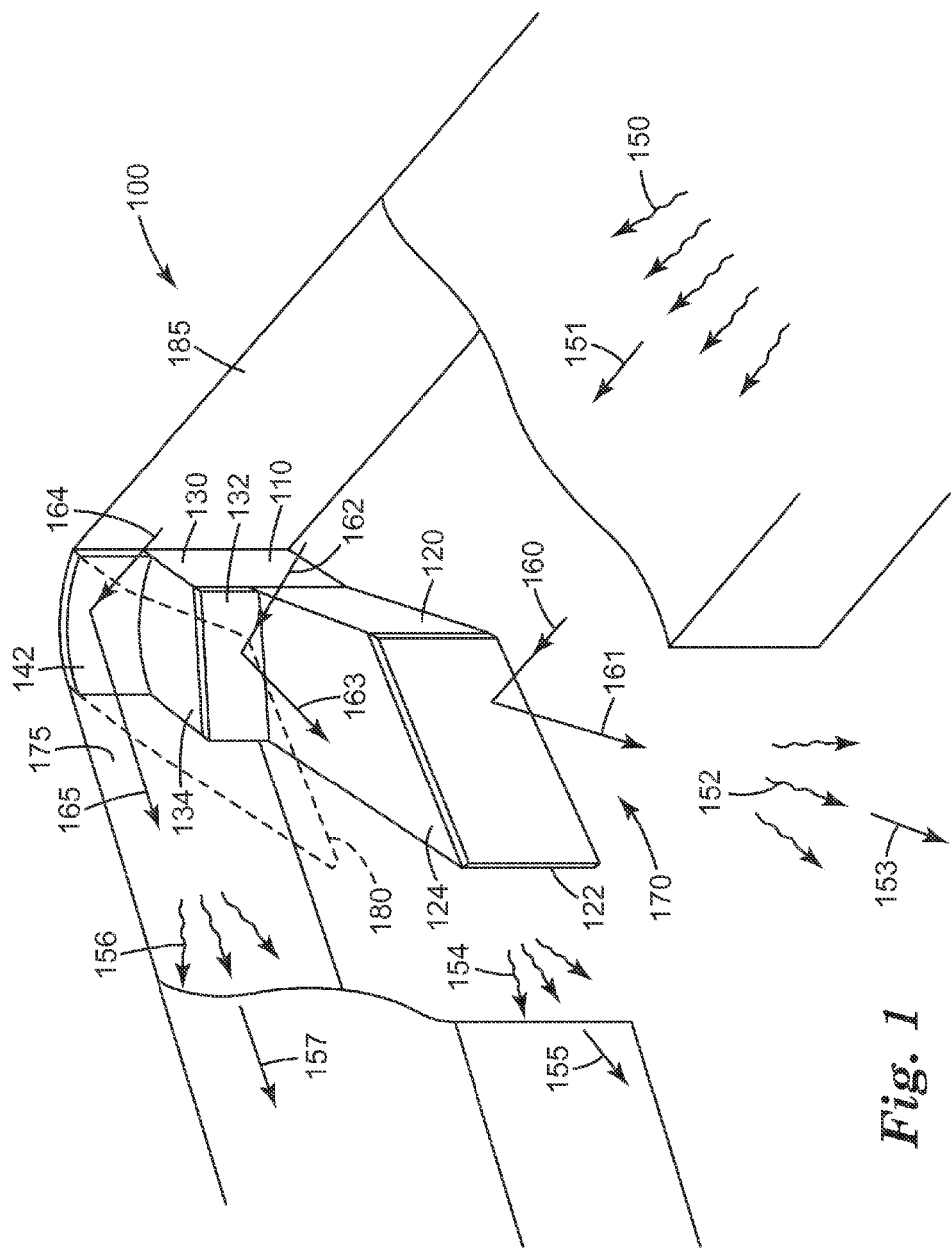
FIG. 1 is a schematic three-dimensional view of a lightguide.

FIG. 1 is a schematic three-dimensional view of a lightguide 100 that includes a staircase shape optical construction 110 that receives an input light 150 propagating in a general input direction 151 and reflects the received light in a plurality of output directions. For example, optical construction 110 reflects a first portion of input light 150 as a first output light 152 propagating in a general first output direction 153, a second portion of input light 150 as a second output light 154 propagating in a general second output direction 155, and a third portion of input light 150 as a third output light 156 propagating in a general third output direction 157. In some cases, different output directions can be in different legs or branches of the lightguide. For example, output direction 157 can be in one output branch of the lightguide and output direction 155 can be in a different output branch of the lightguide. In some cases, two or more output directions can be in the same output branch of the lightguide. For example, output directions 153 and 155 can be the same or different directions in the same output branch of the lightguide.

Optical construction 110 includes a plurality of steps where each step can include a riser and tread. For example, optical construction 110 includes a first step 120 that includes a first riser 122 and a first tread 124, a second step 130 that includes a second riser 132 and a second tread 134, and a third riser 142 that can be part of a third step.

In some cases, some of the risers in optical construction 110 are light reflecting risers designed to reflect incident light along one or more desired directions. In some cases, each of the risers in optical construction 110 is a light reflecting riser. The light reflecting risers reflect input light 150 along the different output directions. For example, light reflecting first riser 122 reflects the first portion of input light 150 as first output light 152 propagating along first output direction 153, the second portion of input light 150 as second output light 154 propagating along second output direction 155, and the third portion of input light 150 as third output light 156 propagating along third output direction 157. For example, first riser 122 reflects an incident light ray 160 that propagates along input direction 150 as reflected light ray 161 propagating along first output direction 153, second riser 132 reflects an incident light ray 162 that propagates along input direction 150 as reflected light ray 163 propagating along second output direction 155, and third riser 142 reflects an incident light ray 164 that propagates along input direction 150 as reflected light ray 165 propagating along third output direction 157.

In general, the light reflecting risers can be placed anywhere in the lightguide that may be desirable in an application. For example, in some cases, a light reflecting riser can be disposed on an inner wall of the lightguide. For example, third riser 142 is disposed on an inner wall 175 of lightguide 100. In some cases, at least one of the light reflecting risers is disposed in an interior of the lightguide. For example, respective first and second light reflecting risers 122 and 132 are disposed in an interior 170 of the lightguide.

Figure 2:
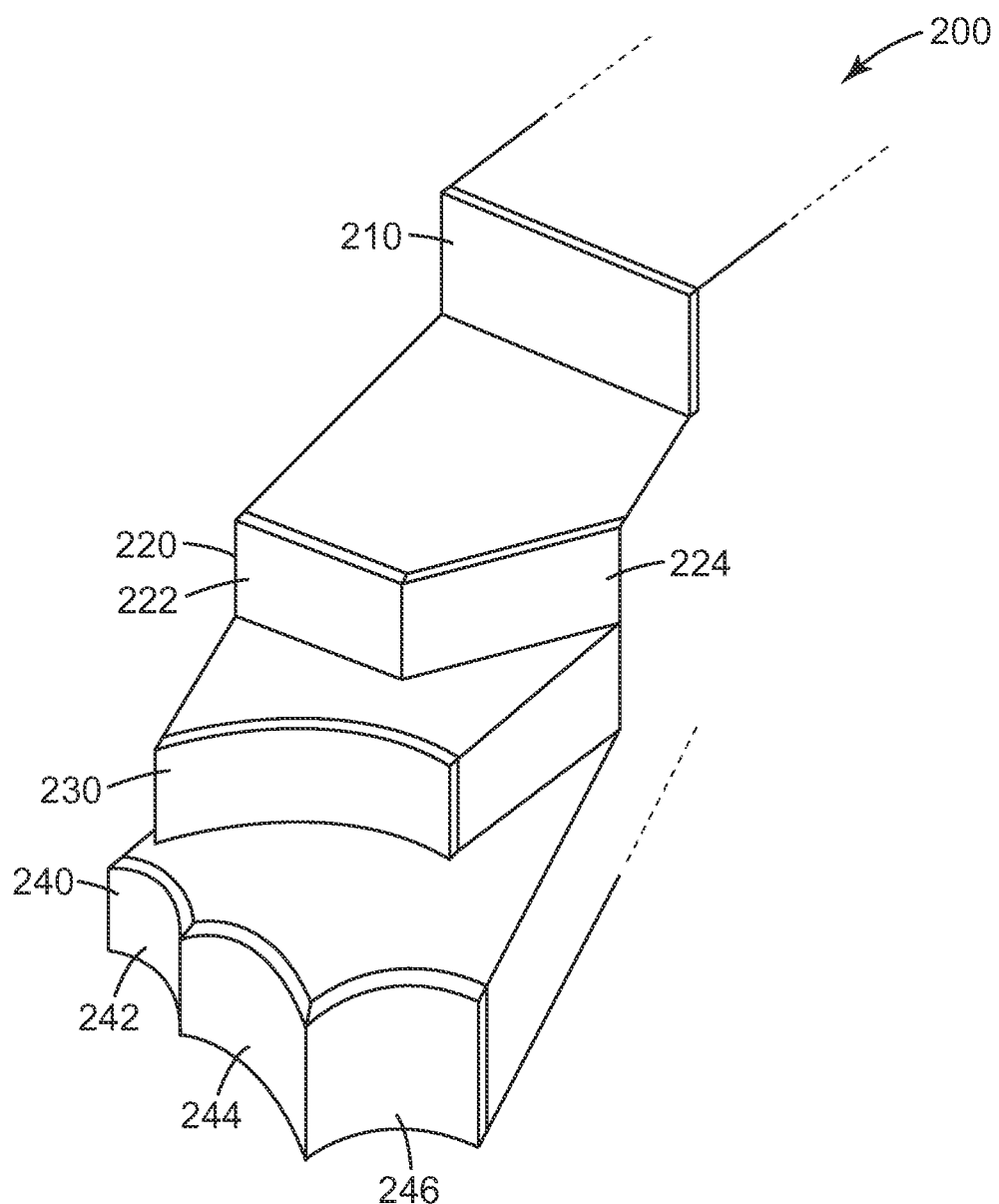
FIG. 2 is a schematic three-dimensional view of a staircase shape optical construction.

In general, the light reflecting risers can have any shape that may be desirable in an application. For example, in some cases, a light reflecting riser can be or include one or more planar facets, piecewise planar facets, curved facets, or piecewise curved facets, or any combination of such facets. For example, respective first and second risers 122 and 132 are planar, and third riser 142 is curved. As another example, FIG. 2 is a schematic three-dimensional view of an optical construction 200 that can be incorporated into a lightguide and includes a planar rise 210, a piecewise planar riser 220 that includes a first planar portion 222 and a second planar portion 224, a curved riser 230, and a piecewise curved riser 240 that includes a first curved portion 242, a second curved portion 244, and a third curved portion 246.

In some cases, at least two risers include non-parallel light reflecting portions. In some cases, at least two risers are not parallel with each other. For example, referring to FIG. 1, first riser 122 is not parallel with second riser 132, meaning that light rays incident on the two risers along the same direction are reflected along different directions. As another example, referring to FIG. 2, riser 210 is parallel to first portion 222, but not to second portion 224, of riser 220.

At least some of the risers in the disclosed optical constructions are substantially light reflecting. For example, light reflecting first riser 122 can have an average specular optical reflectance in the visible for normally incident light that is not less than about 50%, or not less than about 60%, or not less than about 70%, or not less than about 80%, or not less than about 90%, or not less than about 95%. A disclosed light reflecting riser, such as first riser 122, can be any type reflector that may be desirable and/or practical in an application. For example, riser 122 can be a metal reflector such as an aluminized reflector or a multi-layer polymeric reflector, such as an enhanced specular reflector (ESR) film (available from 3M Company, St. Paul, Minn.). In some cases, optical construction 110 includes at least two, or at least three, or at least four, light reflecting risers.

In some cases, a light reflecting riser can reflect light by Fresnel (or interfacial) reflection. For example, in some cases, incident light ray 160 can be reflected at first riser 122 by undergoing Fresnel reflection at an interface between optical construction 110 and interior 170 of the lightguide. In such cases, interior 170 can be a hollow interior and optical construction 110, or at least first step 120, can be a solid construction.

In some cases, lightguide 100 emits light through at least a portion of an emitting surface 185 of the lightguide where emitting surface 185 can, for example, be the top surface of the lightguide. Optical construction 110 has a projected area 180 onto light emitting surface 185. In some cases, lightguide 100 emits substantially uniform light across projected area 180. For example, the difference between the maximum and minimum light intensities across projected area 180 is not greater than about 20%, or not greater than about 15%, or not greater than about 10%, or not greater than about 5%.

Figure 8:
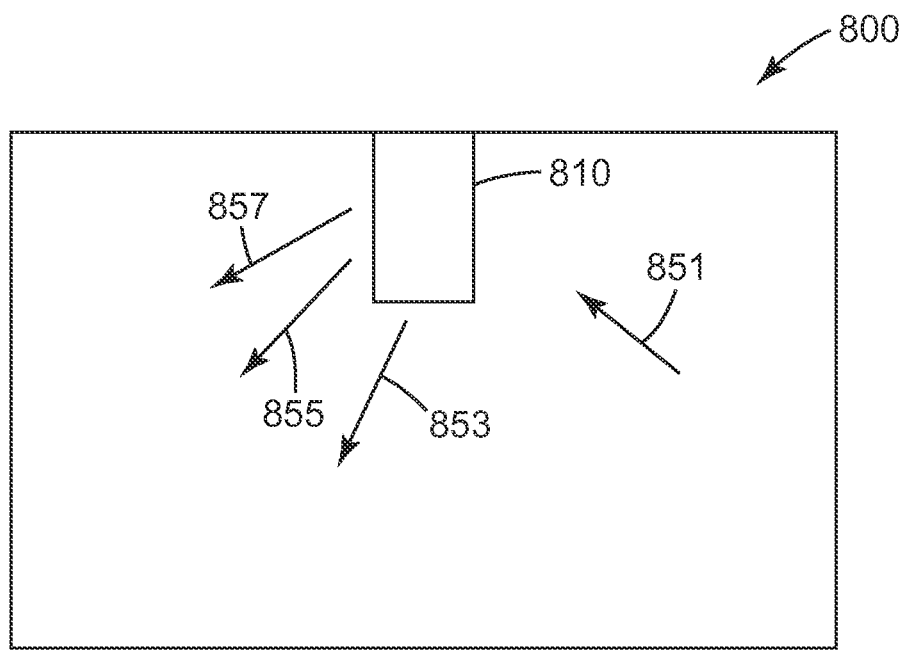
FIG. 8 is a schematic top-view of a lightguide.

In some cases, lightguide 100 does not include an output branch. For example, FIG. 8 is a schematic top-view of a lightguide 800 that includes an optical construction 810 disposed within the lightguide. Optical construction 810 can be similar to any optical construction disclosed herein. For example, optical construction 810 can be similar to optical construction 110 reflecting light propagating within the lightguide along an incident direction 7851 along respective first, second and third reflected directions 853, 855 and 857 within the lightguide.

Figure 3:
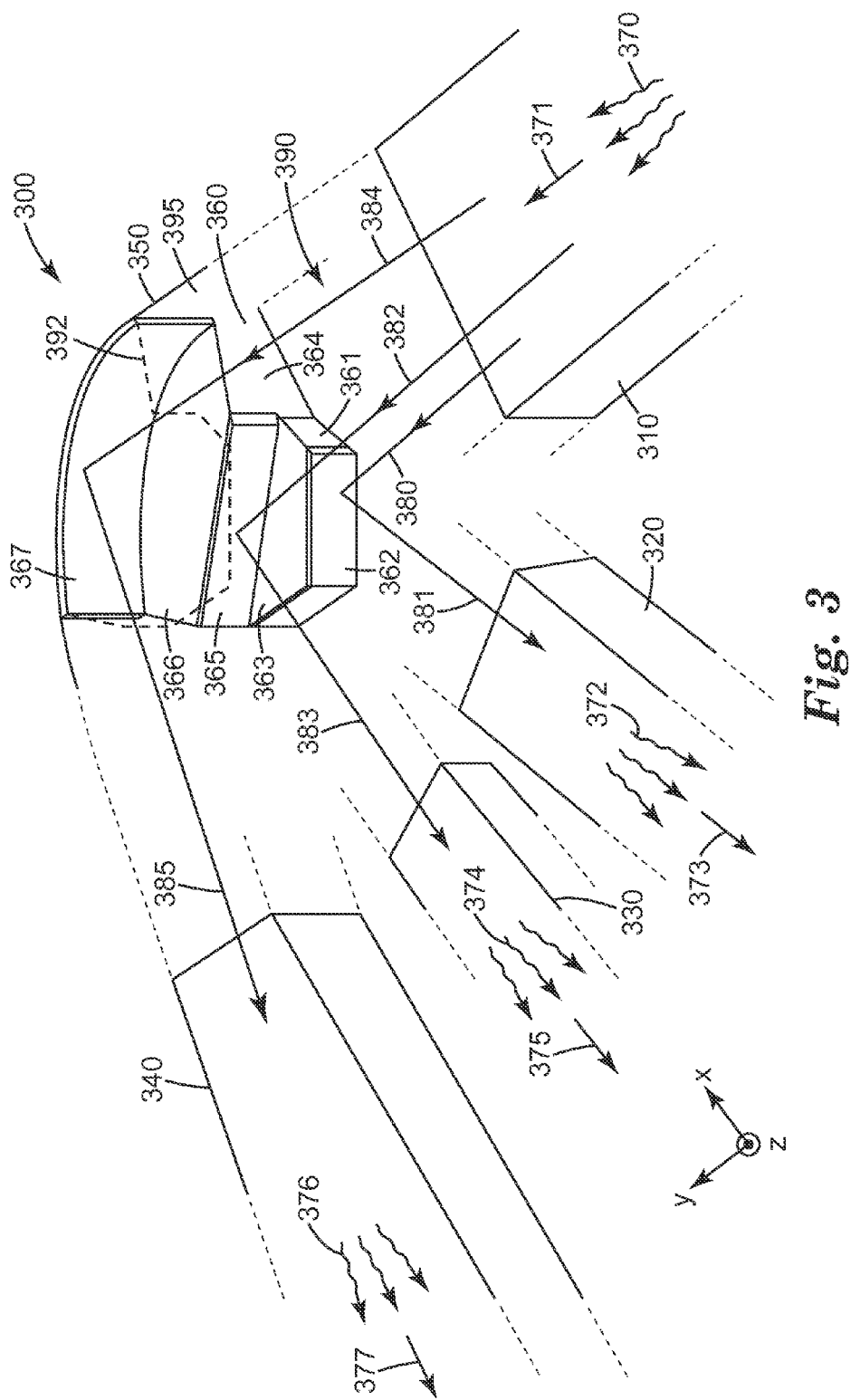
FIG. 3 is a schematic three-dimensional view of another lightguide.

FIG. 3 is a schematic three-dimensional view of a lightguide 300 that includes an input arm 310, a first output arm 320, a second output arm 330, a third output arm 340, and a bend 350 that connects the input arm to the first, second and third output arms. Bend 350 includes a first light reflector 362 for reflecting light from input arm 310 to first output arm 320, a second light reflector 365 for reflecting light from input arm 310 to second output arm 330, and a third light reflector 367 for reflecting light from input arm 310 to third output arm 340. In some cases, the light reflector are offset relative to each other along two mutually orthogonal directions. For example, second reflector 365 is offset relative to first light reflector 362 along mutually orthogonal x- and z-directions, and third reflector 367 is offset relative to second light reflector 365 along the x- and z-directions. In some cases, a light reflector is offset relative to another light reflector along two mutually orthogonal directions, where each of the mutually orthogonal directions is either orthogonal or parallel to a thickness direction of the bend. For example, second reflector 365 is offset relative to first light reflector 362 along mutually orthogonal x- and z-directions, where z-direction is also the thickness direction of bend 350 which is orthogonal to the offset x-direction and parallel to the offset z-direction. In some cases, a light reflector can be offset and rotated relative to another light reflector. For example, second reflector 365 is offset along x- and z-directions and rotated about the z-axis relative to first light reflector 362. In some cases, the light reflector are offset relative to each other along two mutually orthogonal directions where one of the directions is along the thickness direction of the lightguide. In some cases, the light reflector are offset relative to each other along three mutually orthogonal directions.

In some cases, such as in the exemplary lightguide 300, light reflectors 362, 365 and 367 form risers in an staircase shape optical construction 360. Staircase shape optical construction 360 receives an input light 370 propagating in input arm 310 along a general input direction 371 and reflects the received light in a plurality of output directions. For example, optical construction 350 reflects a portion of input light 371 as a first output light 372 propagating in first output arm 320 along a general first output direction 373, another portion of input light 370 as a second output light 374 propagating in second output arm 330 along a general second output direction 375, and another portion of input light 370 as a third output light 376 propagating in third output arm 340 along a general third output direction 377. Optical construction 360 includes a plurality of steps, where each step can include a riser and a tread. For example, optical construction 360 includes a first step 361 that includes a first riser 362 and a first tread 363, a second step 364 that includes a second riser 365 and a second tread 366, and a third riser 367 that can be part of a third step.

The risers in optical constructions 360 are light reflecting risers and reflect input light 371 along different output directions. For example, light reflecting first riser 362 reflects a first portion of input light 370 propagating in input arm 310 along input direction 371 as first output light 372 propagating in first output arm 330 along first output direction 373, a second portion of input light 370 as second output light 374 propagating in second output arm 330 along second output direction 375, and a third portion of input light 370 as third output light 376 propagating in third output arm 340 along third output direction 377. For example, first riser 362 reflects an incident light ray 380 that propagates in input arm 310 along input direction 371 as reflected light ray 381 propagating in first output arm 320 along first output direction 373, second riser 365 reflects an incident light ray 382 that propagates in input arm 310 along input direction 371 as reflected light ray 383 propagating in second output arm 330 along second output direction 375, and third riser 367 reflects an incident light ray 384 that propagates in input arm 310 along input direction 371 as reflected light ray 385 propagating in third output arm 340 along third output direction 377.

In some cases, lightguide 300 is hollow. In such cases, input arm 310, first output arm 320, second output arm 330, third output arm 340, and bend 350 are hollow. In such cases, optical construction 360 is disposed and formed in a hollow interior 390 of bend 350. In some cases, light guide 300 can have a hollow bend 350, but solid input and output arms.

In some cases, at least one of the light reflecting risers in optical construction 360 is or includes a metal light reflector or a reflective multilayer optical film. Lightguide 300 generally defines a plane of the lightguide, such as the xy-plane. In some cases, at least some of the risers in optical construction 360 are perpendicular to the plane of the lightguide. For example, risers 362 and 365 are perpendicular to the xy-plane.

In some cases, lightguide 300 emits light through at least a portion of an emitting surface 395 of the lightguide where emitting surface 395 can, for example, be the top surface of the lightguide. Optical construction 360 has a projected area 392 onto light emitting surface 395. In some cases, lightguide 300 emits substantially uniform light across projected area 392. For example, the difference between the maximum and minimum light intensities across projected area 392 is not greater than about 20%, or not greater than about 15%, or not greater than about 10%, or not greater than about 5%. In some cases, lightguide 300 emits substantially uniform light across that portion of emitting surface 395 that corresponds to bend 350. For example, the difference between the maximum and minimum light intensities across bend 350 is not greater than about 20%, or not greater than about 15%, or not greater than about 10%, or not greater than about 5%.

Figure 4:
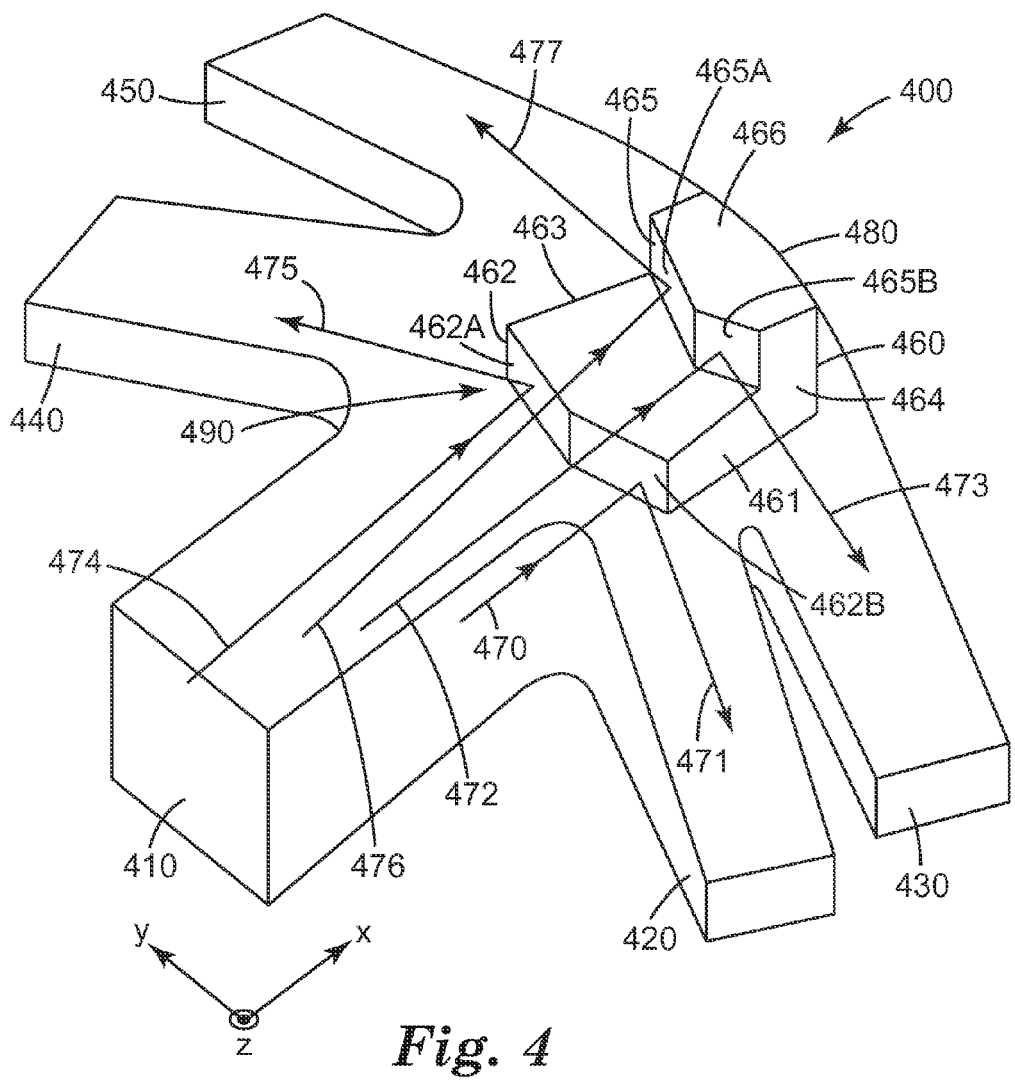
FIG. 4 is a schematic three-dimensional view of another lightguide.

In the exemplary lightguide 300, all the output arms are on the same side of the input arm. In some cases, some output arms are on one side of the input arm and some other output arms are on the other side of the input arm. For example, FIG. 4 is a schematic three-dimensional view of a lightguide 400 that includes an input arm 410, a first output arm 420, a second output arm 430, a third output arm 440, a fourth output arm 450, and a bend 480 for directing light from the input arm to the four output arms. At least one out put arm is disposed on one side of the input arm and at least one other output arm is disposed on another or opposite side of the input arm. In particular, output arms 420 and 430 are on one side of the input arm, and output arms 440 and 450 are on another side of the input arm. In general, lightguide 400 includes an input arm and a plurality of output arms, where one or more of the output arms are on one side of the input arm and one or more of the output arms are on another side of the input arm.

Bend 480 includes a staircase shape optical construction 460 for directing light from the input arm to the plurality of output arms. In general, optical construction 460 includes a plurality of light reflecting risers. In particular, optical construction 460 includes a first step 461 that includes a light reflecting first riser 462 and a first tread 463, and a second step 464 that includes a light reflecting second riser 465 and a second tread 466. Light reflecting first riser 462 is piecewise planar and includes a first planar portion 462A and a second planar portion 462B, and light reflecting second riser 465 is piecewise planar and includes a first planar portion 465A and a second planar portion 465B.

Light reflecting first riser 462 reflects light propagating in input arm 410 toward respective first and second output arms 420 and 430, and light reflecting second riser 465 reflects light propagating in input arm 410 toward respective third and fourth output arms 440 and 450. In particular, second planar portion 462B of first riser 462 reflects light from input arm 410 into first output arm 420, second planar portion 465B of second riser 465 reflects light from input arm 410 into second output arm 430, first planar portion 462A of first riser 462 reflects light from input arm 410 into third output arm 440, and first planar portion 465A of second riser 465 reflects light from input arm 410 into fourth output arm 450. For example, second planar portion 462B of first riser 462 reflects incident light ray 470 that exits input arm 410 as reflected light ray 471 propagating in first output arm 420, second planar portion 465B of second riser 465 reflects incident light ray 472 that exits input arm 410 as reflected light ray 473 propagating in second output arm 430, first planar portion 462A of first riser 462 reflects incident light ray 474 that exits input arm 410 as reflected light ray 475 propagating in third output arm 440, and first planar portion 465A of second riser 465 reflects incident light ray 476 that exits input arm 410 as reflected light ray 477 propagating in fourth output arm 450.

In some cases, lightguide 400 is hollow. In such cases, input arm 410, first output arm 420, second output arm 430, third output arm 440, fourth output arm 450, and bend 480 are hollow. In such cases, optical construction 460 is disposed and formed in a hollow interior 490 of bend 480. In some cases, light guide 400 can have a hollow bend 480, but solid input and output arms.

In the exemplary lightguide 400, first and second risers are piecewise planar. In general, the risers can have any shape that may be desirable in an application. For example, in some cases, a light reflecting riser can be or include one or more planar facets, piecewise planar facets, curved facets, or piecewise curved facets, or any combination of such facets.

Figure 5:
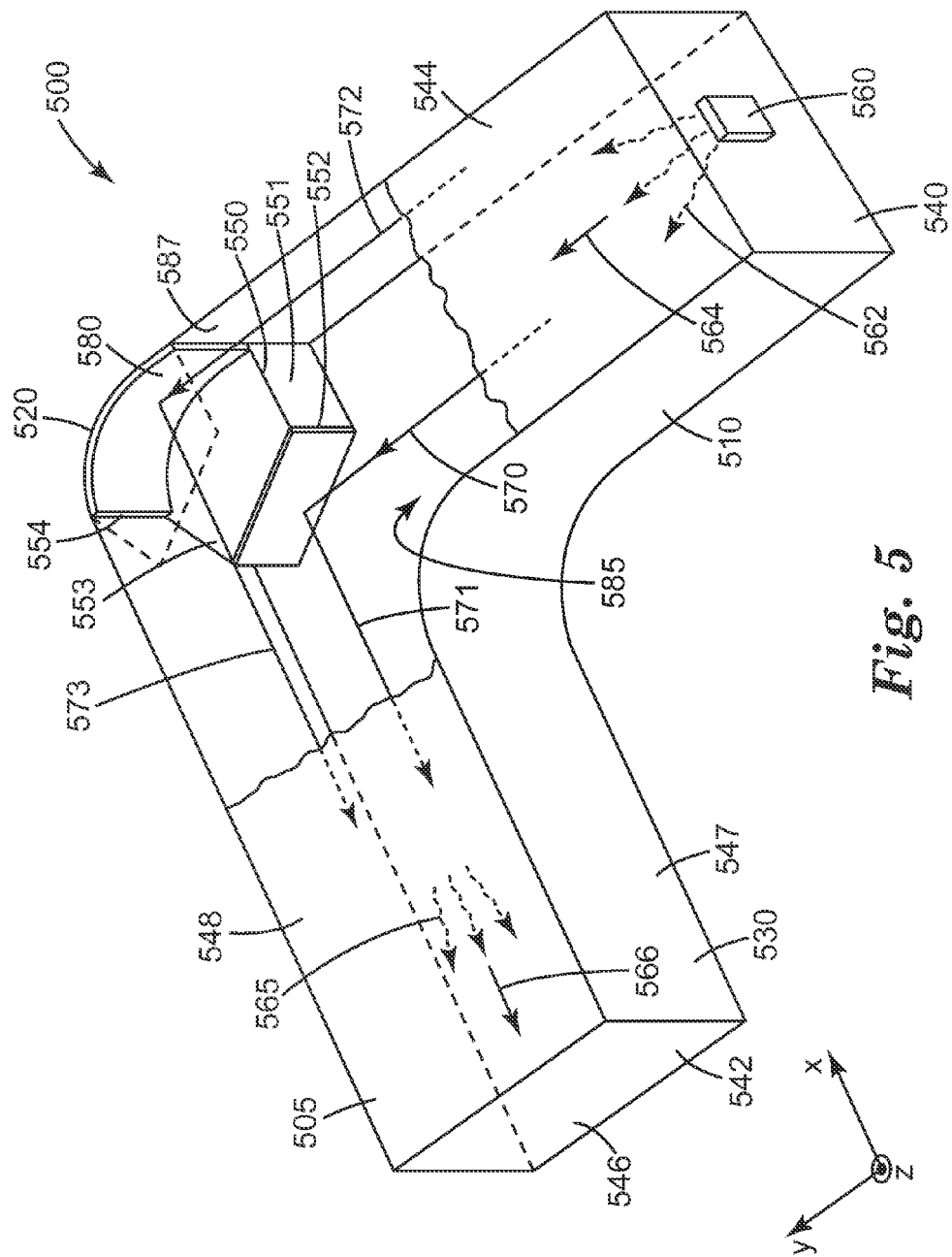
FIG. 5 is a schematic three-dimensional view of a light source.

The disclosed lightguides can advantageously be incorporated into light sources, such as extended light sources, to provide a desired, such as uniform, illumination. For example, FIG. 5 is a schematic three-dimensional view of a light source 500 that includes a hollow lightguide 505 and a lamp 560. Lightguide 505 is a bent lightguide and includes a first end face 540, a second end face 542, a top light emitting surface 544, a first side wall 547, a second side wall 548, and a bottom surface 546. Lightguide 505 is a bent hollow lightguide and includes a hollow first arm 510, a hollow second arm 530, and a hollow bend 520 for attaching or connecting the two arms. Second arm 730 makes an oblique angle θ with first arm 710.

Lamp 560 is disposed on or near first end surface 540 of the lightguide and emits light 562 that travels within first arm 510 along a general first direction 564. Hollow bend 520 includes a staircase shape optical construction 550 for reflecting light 562 as reflected light 565 travelling in second arm 530 along a general second direction 566. In general, optical construction 550 includes a plurality of light reflecting risers. In particular, optical construction 550 includes a first step 551 that includes a first light reflecting riser 552 and a first tread 553, and a second light reflecting riser 554 that can be part of a second step. Light reflecting risers 552 and 554 reflect incident light 562 around bend 520 as reflected light 565. In particular, first light reflecting riser 552 reflects a first portion of incident light 562 as a first portion of reflected light 566, and second light reflecting riser 554 reflects a second or remaining portion of incident light 562 as a second or remaining portion of reflected light 566. The first and second reflected portions combine to form reflected light 565. For example, first riser 552 reflects an incident light ray 570 that propagates within first arm 510 along direction 564 as reflected light ray 571 propagating within second arm 530 along direction 566, and second riser 554 reflects an incident light ray 572 that propagates within first arm 510 along direction 564 as reflected light ray 573 propagating within second arm 530 along direction 566.

First light reflecting riser 552 is disposed in a hollow interior 585 of bend 520 and second light reflecting riser 554 is disposed on an inner wall 587 of bend 520, where wall 587 is a portion of second wall 548. In some cases, such as in the exemplary lightguide 505, second riser 554 is a film or a coating disposed on inner wall 587 of the lightguide. In some cases, inner wall 587 can be sufficiently reflective. In such cases, second riser 554 can simply be that portion of inner wall 587 that reflects light from the first arm toward the second arm.

Lightguide 505 emits light that enters the lightguide from lamp 560 through top emitting surface 544. In general, the inside surfaces of first side wall 547, second side wall 548, and bottom surface 546 are substantially light reflecting. For example, in such cases, the reflectance of the inner surfaces of the side walls and the bottom surface is not less than about 50%, or not less than about 60%, or not less than about 70%, or not less than about 80%, or not less than about 90%, or not less than about 95%. In some cases, the inner surfaces of the side walls and the bottom surface reflect light 562 by total internal reflection. In some cases, top surface 544 is transflective meaning that the top surface is partially reflective and partially transmissive. In such cases, as light 562 travels inside the hollow lightguide and is incident on the top surface, a portion of the incident light is transmitted by the top surface which becomes part of the light emitted by the light source, and a portion of the incident light is reflected. In some cases, a transflective top surface 544 can include a leaky mirror that is substantially reflective, and slightly transmittance specially for oblique incident light rays. For example, in such cases, the optical transmittance of a leaky mirror top surface 544 is in a range from about 95% to about 99.99%, or from about 96% to about 99.9%, or from about 97% to about 99.9%, or from about 98% to about 99.9%.

In some cases, top surface 544 has a varying optical transmittance across the top surface. For example, the top surface can have a lower optical transmittance closer to lamp 560 and a higher optical transmittance farther from the lamp. In such cases, the optical transmittance of the top surface is not greater than about 70%, or not greater than about 65%, or not greater than about 60%, or not greater than about 55%, or not greater than about 50%, for areas near first end surface 540, and the optical transmittance of the top surface is not less than about 70%, or not less than about 75%, or not less than about 80%, or not less than about 85%, or not less than about 90%, for areas near second end surface 542.

Figure 6:
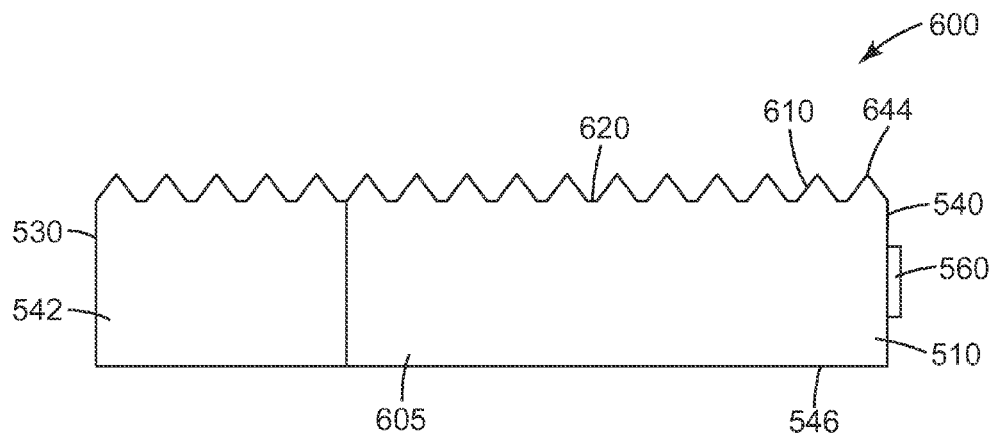
FIG. 6 is a schematic side-view of a light source.

In some cases, top surface 544 can be structured. For example, FIG. 6 is a schematic side-view of a hollow light source 600 that includes a hollow lightguide 605 that is similar to lightguide 505 except that lightguide 605 includes a structured light emitting top surface 644 that includes a plurality of structures 610. In general, structures 610 can have any shape and can be arranged in any pattern that may be desirable in an application. For example, in some cases, structures 610 are retro-reflective structures, such as retro-reflective corner cubes. In some cases, structures 610 are spaced apart from each other by spaces 620 that are at least partially light transmitting.

Referring back to FIG. 5, light source 500 emits substantially uniform light across a projected area 580 of optical construction 550 onto light emitting top surface 544 of lightguide 505. For example, the difference between the maximum and minimum light intensities across projected area 580 is not greater than about 20%, or not greater than about 15%, or not greater than about 10%, or not greater than about 5%. In some cases, light source 500 emits substantially uniform light across light emitting top surface 544 of lightguide 505. For example, the difference between the maximum and minimum light intensities across the emitting surface is not greater than about 20%, or not greater than about 15%, or not greater than about 10%, or not greater than about 5%.

The exemplary lightguide 505 is hollow. In some cases, lightguide 505 can include one or more hollow portions and one or more solid portions. For example, in some cases, lightguide 505 can include solid first and second arms and a hollow bend 520. In such cases, staircase shape optical construction 550 can be disposed in a hollow portion of bend 520. In some cases, lightguide 505 is a solid lightguide except for a hollow optical construction that can, for example, be molded into solid bend 520.

Figure 7:
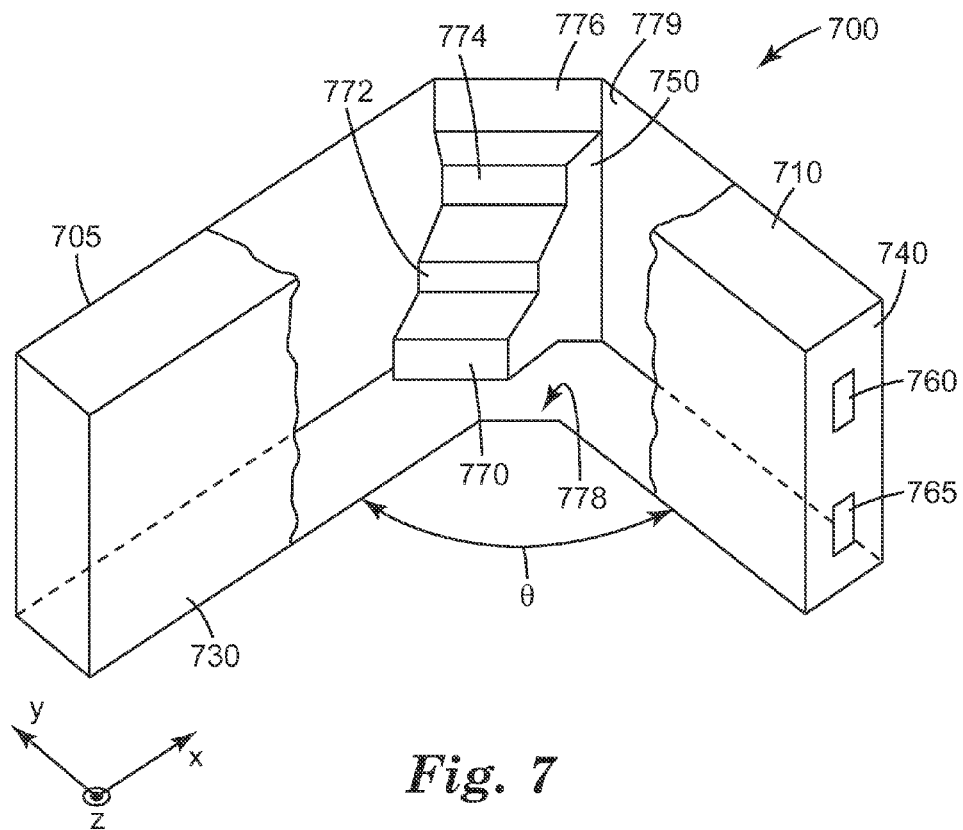
FIG. 7 is a schematic three-dimensional view of another light source.

The exemplary light source 500 is planar meaning that the light source generally lies in, or generally defines, a plane of the light source. In some cases, light source 500 can be non-planar. For example, FIG. 7 is a schematic three-dimensional view of a non-planar light source 700 that includes a non-planar lightguide 705, and lamps 760 and 765 disposed on an end face 740 of the lightguide. Lightguide 705 includes a planar first arm 710, a planar second arm 730 and a bend 720 that connects the first and second arms. Bend 720 includes a staircase shape optical construction 750 that reflects light from the first arm to the second arm. Optical construction 750 includes a first light reflecting riser 770, a second light reflecting riser 772, a third light reflecting riser 774, and a fourth light reflecting riser 776. Light reflecting risers 770, 772 and 774 are disposed on an interior 778 of bend 720. Light reflecting riser 776 is disposed on, or is a portion of, an inner wall 779 of bend 720. The light reflecting risers reflect light that is emitted by lamps 760 and 765 into second arm 730.

As used herein, terms such as "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the image in FIG. 5 is flipped as compared to the orientation in the figure, surface 544 is still considered to be the top major surface of lightguide 505.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A lightguide comprising a staircase shape optical construction comprising a plurality of light reflecting risers, at least two risers in the plurality of light reflecting risers comprising non-parallel light reflecting portions,
   wherein the lightguide is hollow, and further comprises an input arm disposed facing first and second non-parallel light reflecting portions in the light reflecting portions, and the first and second non-parallel reflecting portions reflect light from the input arm into different directions that are on the same side of the input arm, and
   wherein the first and second non-parallel light reflecting portions are offset with respect to each other along two mutually orthogonal directions, each of the two mutually orthogonal directions is orthogonal or parallel to a thickness direction of the lightguide, and the first and second non-parallel light reflecting portions are rotated with respect to each other about an axis parallel to the thickness direction of the lightguide.

2. The lightguide of claim 1, wherein one of the light reflecting risers is disposed on an inner wall of the lightguide and at least another of the light reflecting risers is disposed in an interior of the lightguide.

3. The lightguide of claim 1, wherein at least two of the light reflecting risers have an average specular optical reflectance in the visible for normally incident light that is not less than about 60%.

4. The lightguide of claim 1, wherein at least one of the light reflecting risers comprises a reflective multilayer optical film or a metal light reflector.

5. A lightguide comprising:
   an input arm;
   a first output arm;
   a second output arm; and
   a bend connecting the input arm to the first and second output arms and comprising:
      a first light reflector for reflecting light from the input arm to the first output arm;
      a second light reflector for reflecting light from the input arm to the second output arm, the second light reflector being offset relative to the first light reflector along two mutually orthogonal directions; and
      a staircase shape optical construction comprising a plurality of light reflecting risers, a first riser comprising the first light reflector, a second riser different than the first riser comprising the second light reflector, the first and second light reflectors are rotated with respect to each other about an axis parallel to a thickness direction of the lightguide to reflect light into different directions that are on the same side of the input arm.

6. The lightguide of claim 5, wherein the second light reflector is offset relative to the first light reflector along three mutually orthogonal directions.

7. The lightguide of claim 5 being hollow.

8. The lightguide of claim 5, wherein at least one of the first and second light reflectors comprises a metal light reflector.

9. The lightguide of claim 5, wherein at least one of the first and second light reflectors comprises a reflective multilayer optical film.

10. The lightguide of claim 5 further comprising:
    a third output arm for guiding light; and
    a third light reflector for reflecting light from the input arm to the third output arm, a third riser different than the first and second risers comprising the third light reflector.

11. The lightguide of claim 5, wherein at least one of the first and second light reflectors comprises a planar portion.

12. The lightguide of claim 5, wherein at least one of the first and second light reflectors is piecewise planar.

13. The lightguide of claim 5, wherein at least one of the first and second light reflectors comprises a curved portion.

14. The lightguide of claim 5, wherein at least one of the first and second light reflectors is piecewise curved.

15. A lightguide comprising:
    an input arm;
    a staircase shape optical construction comprising a plurality of light reflecting risers configured to reflect light from the input arm, and
    an emitting surface, at least a portion of the emitting surface being a top surface of the lightguide transversal to a thickness direction of the lightguide,
    wherein a first light reflecting riser in the plurality of light reflecting risers comprises a first light reflecting portion, a second light reflecting riser in the plurality of light reflecting risers comprises a second light reflecting portion, and the first and second light reflecting portions are rotated with respect to each other about an axis parallel to the thickness direction of the lightguide to reflect light from the input arm into different directions that are on the same side of the input arm.

16. The lightguide of claim 15, wherein at least one of the risers in the plurality of light reflecting risers comprises a planar portion.

\* \* \* \* \*